United States Patent
Kwak et al.

(10) Patent No.: US 11,039,478 B2
(45) Date of Patent: Jun. 15, 2021

(54) METHOD FOR PERFORMING INITIAL ACCESS IN WIRELESS COMMUNICATION SYSTEM, AND APPARATUS THEREFOR

(71) Applicant: LG Electronics Inc., Seoul (KR)

(72) Inventors: Kyuhwan Kwak, Seoul (KR); Daesung Hwang, Seoul (KR); Kijun Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,438

(22) PCT Filed: Nov. 3, 2017

(86) PCT No.: PCT/KR2017/012379
§ 371 (c)(1),
(2) Date: May 3, 2019

(87) PCT Pub. No.: WO2018/084618
PCT Pub. Date: May 11, 2018

(65) Prior Publication Data
US 2019/0281635 A1    Sep. 12, 2019

Related U.S. Application Data

(60) Provisional application No. 62/417,306, filed on Nov. 3, 2016.

(51) Int. Cl.
*H04W 74/08*     (2009.01)
*H04L 5/00*      (2006.01)
(Continued)

(52) U.S. Cl.
CPC ....... *H04W 74/0833* (2013.01); *H04L 5/0048* (2013.01); *H04W 72/04* (2013.01);
(Continued)

(58) Field of Classification Search
CPC ............. H04W 74/0833; H04W 72/04; H04W 72/042; H04W 74/00; H04L 5/0048
See application file for complete search history.

(56) References Cited

U.S. PATENT DOCUMENTS

| 2013/0223251 A1 | 8/2013 | Li et al. |
| 2014/0226609 A1* | 8/2014 | Hooli ................. H04W 72/042 370/329 |

(Continued)

FOREIGN PATENT DOCUMENTS

| WO | WO15129985 | 9/2015 |
| WO | WO2016161408 | 10/2016 |

OTHER PUBLICATIONS

Qualcomm Incorporated, "Initial access and mobility consideration for NR sub6GHz," R1-166385, 3GPP TSG-RAN WG1 #86, Gothenburg, Sweden, dated Aug. 13, 2016, 6 pages.

(Continued)

*Primary Examiner* — Donald L Mills
(74) *Attorney, Agent, or Firm* — Fish & Richardson P.C.

(57) ABSTRACT

Disclosed are a method for performing an initial access in a wireless communication system, and an apparatus therefor. Specifically, a method by which a terminal performs an initial access comprises the steps of: receiving, from a base station, configuration information representing one or more physical random access channel (PRACH) configurations; receiving, from the base station, downlink control information including information indicating a specific PRACH configuration among the one or more PRACH configurations, through a physical downlink control channel; and transmitting a preamble and/or data, which are related to the initial access, to the base station through a PRACH on the basis of the specific PRACH configuration.

20 Claims, 7 Drawing Sheets

(a)

(b)

(c)

(d)

(51) Int. Cl.
 *H04W 72/04* (2009.01)
 *H04W 74/00* (2009.01)
(52) U.S. Cl.
 CPC ......... *H04W 72/042* (2013.01); *H04W 74/00* (2013.01); *H04W 74/08* (2013.01)

(56) References Cited

U.S. PATENT DOCUMENTS

| | | | |
|---|---|---|---|
| 2014/0233528 A1* | 8/2014 | Webb | H04L 5/0094 370/330 |
| 2015/0110086 A1 | 4/2015 | Li et al. | |
| 2015/0181624 A1 | 6/2015 | Hwang et al. | |
| 2015/0271854 A1 | 9/2015 | Pelletier et al. | |
| 2019/0116615 A1* | 4/2019 | Harada | H04W 72/0446 |
| 2019/0141728 A1* | 5/2019 | Takeda | H04W 74/08 |
| 2019/0150202 A1* | 5/2019 | Harada | H04W 74/006 370/329 |
| 2019/0159265 A1* | 5/2019 | Takeda | H04W 74/0833 |

OTHER PUBLICATIONS

Extended European Search Report in European Appln. No. 17866554.3, dated May 14, 2020, 7 pages.
MediaTek Inc., Flexible RACH, R2-166591, 3GPP TSG-RAN2 #95bis Meeting, Kaohsiung, Taiwan, Oct. 10-14, 2016, 5 pages.

\* cited by examiner (a)

(b)

(c)

(d)

METHOD FOR PERFORMING INITIAL ACCESS IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/012379, filed on Nov. 3, 2017, which claims the benefit of U.S. Provisional Application No. 62/417,306, filed on Nov. 3, 2016. The disclosures of the prior applications are incorporated by reference in their entirety.

TECHNICAL FIELD

The present invention relates to a wireless communication system and, more particularly, to a method for performing initial access and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method of performing, by a terminal, initial access on a base station using a random access channel (RACH) procedure.

In relation to this, this specification proposes a method of configuring and indicating one or more physical random access channel configurations (PRACH configurations).

Furthermore, this specification proposes a method of configuring data and the transmission region of the data when a terminal transmits the data and a preamble together through a PRACH.

Furthermore, this specification proposes a method of indicating or configuring, by a base station, a PRACH configuration and/or a configuration for data with respect to a terminal through downlink control information.

Technical objects to be achieved by the present invention are not limited to the aforementioned technical objects, and other technical objects not described above may be evidently understood by a person having ordinary skill in the art to which the present invention pertains from the following description.

Technical Solution

A method of performing initial access by a terminal in a wireless communication system according to an embodiment of the present invention includes receiving, from a base station, configuration information representing one or more physical random access channel (PRACH) configurations, receiving, from the base station, downlink control information including information representing a specific PRACH configuration among the one or more PRACH configurations, through a physical downlink control channel, and transmitting, to the base station, at least one of data or a preamble related to the initial access through a PRACH, based on the specific PRACH configuration. The one or more PRACH configurations are configured based on at least one of whether to transmit the data or a transmission order between the preamble and the data.

Furthermore, the method according to an embodiment of the present invention further includes receiving, from the base station, configuration information representing one or more data sets. The downlink control information may include indication information for a data set to be transmitted by the user equipment, and the data may correspond to a data set identified using the indication information among the one or more data sets.

Furthermore, in the method according to an embodiment of the present invention, the data may include at least one of a contention resolution identifier, a buffer status report, or a radio resource control (RRC) connection request.

Furthermore, in the method according to an embodiment of the present invention, when a numerology configuration applied to the preamble and a numerology configuration applied to the data are not identical, the data may be transmitted along with at least one demodulation reference signal (DMRS).

Furthermore, in the method according to an embodiment of the present invention, the downlink control information may further include information representing a length of the preamble, and the length of the preamble may be configured based on the number of symbols allocated to the transmission region of the data.

Furthermore, in the method according to an embodiment of the present invention, the number of symbols allocated to the transmission region of the data may be determined based on a data set corresponding to the data among pre-configured one or more data sets.

Furthermore, in the method according to an embodiment of the present invention, the length of the preamble and the transmission region of the data may be configured based on a time resource region pre-configured for the specific PRACH configuration.

Furthermore, in the method according to an embodiment of the present invention, the downlink control information may further include information representing whether to perform a beam management procedure related to the initial access.

Furthermore, in the method according to an embodiment of the present invention, the downlink control information may further include information representing a PRACH resource, corresponding to the specific PRACH configuration, among one or more PRACH resources pre-configured for the one or more PRACH configurations.

Furthermore, in the method according to an embodiment of the present invention, one of the one or more PRACH configurations may be configured as a default PRACH configuration.

Furthermore, in the method according to an embodiment of the present invention, at least one of the preamble or the data may be transmitted when the user equipment is a radio access network (RAN) controlled state.

A user equipment performing initial access in a wireless communication system according to an embodiment of the present invention includes a radio frequency (RF) unit configured to transmit and receive radio signals and a processor functionally connected to the RF unit. The processor is configured to receive, from a base station, configuration information representing one or more physical random access channel (PRACH) configurations, receive, from the base station, downlink control information including information representing a specific PRACH configuration among the one or more PRACH configurations, through a physical downlink control channel, and transmit, to the base station, at least one of data or a preamble related to the initial access through a PRACH, based on the specific PRACH configuration. The one or more PRACH configurations are configured based on at least one of whether to transmit the data or a transmission order between the preamble and the data.

Advantageous Effects

According to an embodiment of the present invention, there is an effect in that an optimized initial access procedure can be performed from the viewpoint of a network situation and/or latency because a preamble and/or data configuration transmitted through a PRACH is adaptively selected.

Furthermore, according to an embodiment of the present invention, there is an effect in that an optimized initial access procedure can be performed from the viewpoint of the coding rate of data and synchronization because a preamble length is adaptively adjusted within the same PRACH configuration (or PRACH format).

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

MODE FOR INVENTION

Figure 1:
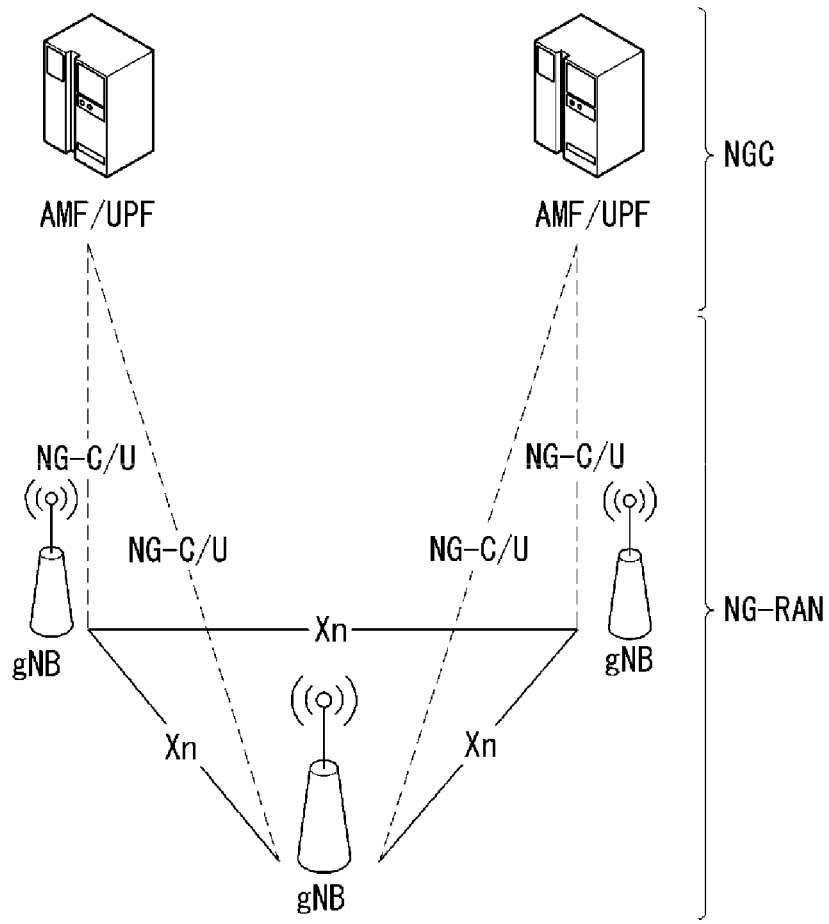
FIG. 1 illustrates an example of an overall system structure of new RAT (NR) to which a method proposed in this specification may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), a generation NodeB (gNB) and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

Overview of NR System

As the supply of smartphones and Internet of things (IoT) UEs is rapidly spread, the amount of information exchanged over a communication network is increased. Accordingly, in a next-generation radio access technology, an environment (e.g., enhanced mobile broadband communication) in which faster service is provided to more users compared to the existing communication system (or existing radio access technology) needs to be taken into consideration.

To this end, the design of a communication system in which machine type communication (MTC) provides services by connecting a plurality of devices and objects is taken into consideration is being discussed. Furthermore, the design of a communication system (e.g., ultra-reliable and low latency communication (URLLC)) in which services and/or terminals sensitive to communication reliability and/or latency are taken into consideration is also discussed.

Hereinafter, in this specification, for convenience of description, the next-generation radio access technology is referred to as a new radio access technology (RAT) (NR), and a wireless communication system to which the NR is applied is referred to as an NR system.

Term Definition eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

Figure 2:
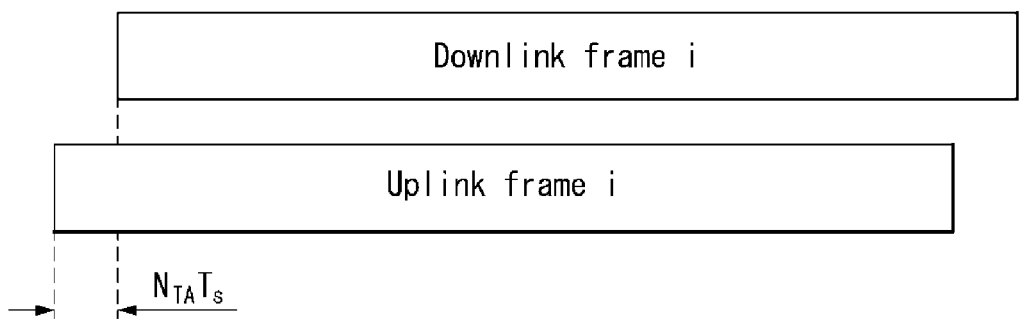
FIG. 2 illustrates the relation between an uplink frame and a downlink frame in a wireless communication system to which a method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
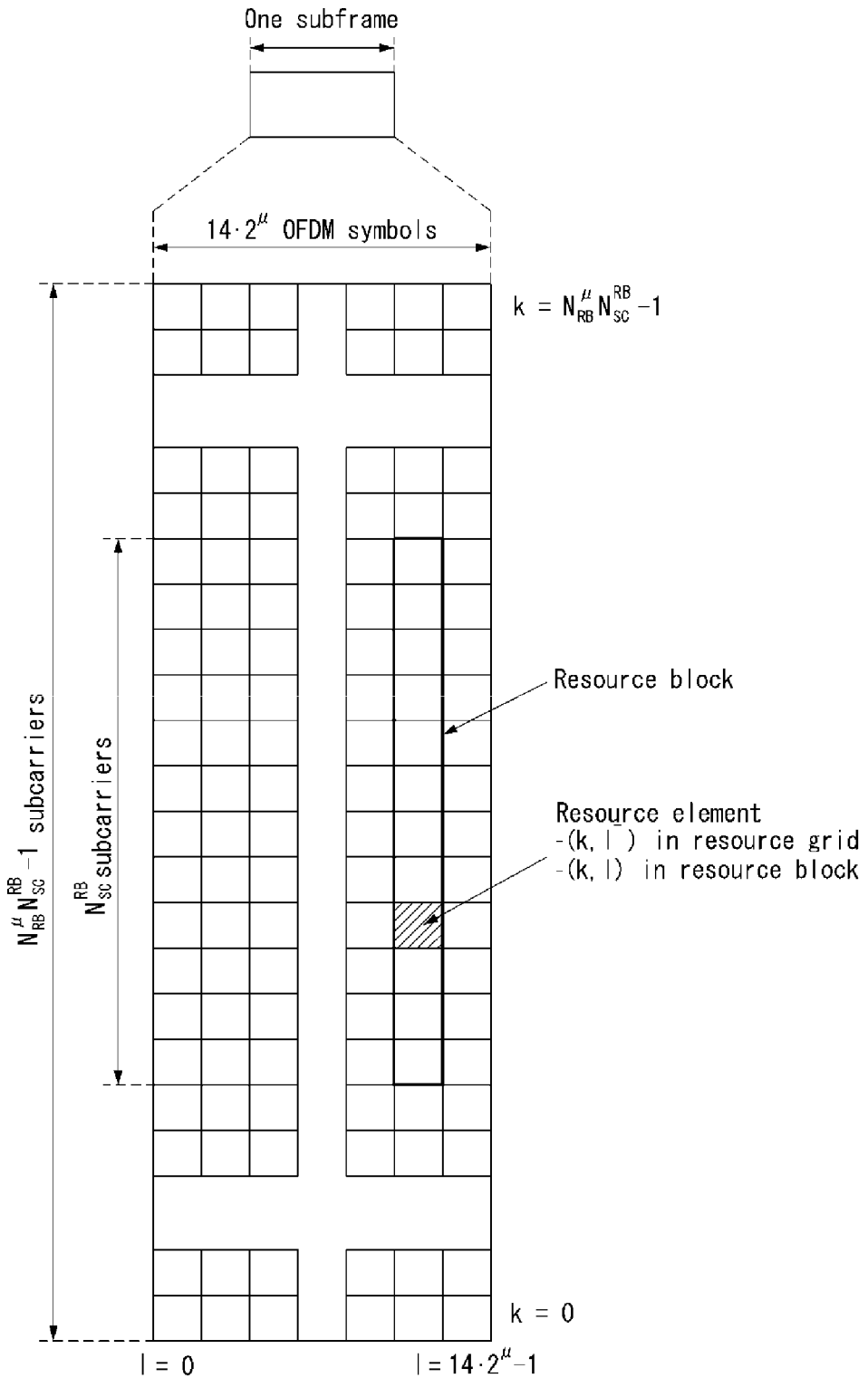
FIG. 3 illustrates an example of a resource grid supported in a wireless communication system to which a method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu N_{RB}^{max,\mu}$. The above $N_{RB}^{max,\mu}$ indicates the maximum transmission bandwidth, and it may change not just between numerologies, but between UL and DL.

Figure 4:
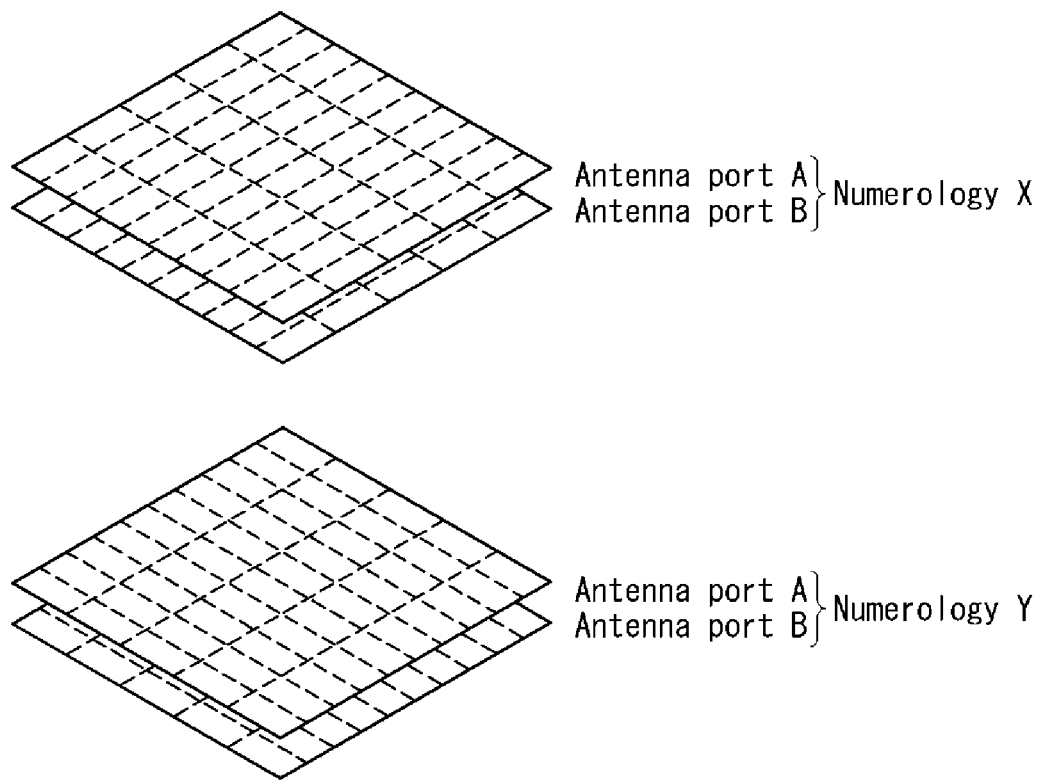
FIG. 4 illustrates examples of an antenna port and a resource grid for each numerology to which a method proposed in this specification may be applied.

In this case, as illustrated in FIG. 4, one resource grid may be configured for the numerology μ and an antenna port p.

FIG. 4 illustrates examples of resource grids for each antenna port and numerology to which a method proposed in this specification may be applied.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel Each element of the resource grid for the numerology μ and the antenna port p is indicated as a resource element, and may be uniquely identified by an index pair (k,l). Herein, $k=0, \ldots, N_{RB}^\mu N_{sc}^{RB}-1$ is an index in the frequency domain, and $l=0, \ldots, 2^\mu N_{symb}^{(\mu)}-1$ indicates a location of a symbol in a subframe. To indicate a resource element in a slot, the index pair (k,l) is used. Herein $l=0, \ldots, N_{symb}^\mu-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{(Equation 1)}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Physical Random Access Channel (PRACH)

First, the time and frequency structure of a PRACH are described. A physical random access preamble is the same as FIG. 5.

Figure 5:
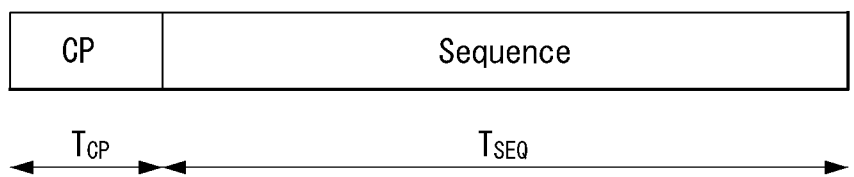
FIG. 5 illustrates an example of a random access preamble format to which a method proposed in this specification may be applied.

FIG. 5 illustrates an example of a random access preamble format to which a method proposed in this specification may be applied.

Referring to FIG. 5, the random access preamble is configured with the cyclic prefix of a length $T_{CP}$ and the sequence part of a length $T_{SEQ}$. In this case, the parameter values (i.e., $T_{CP}$ and $T_{SEQ}$) are the same as of Table 4, which may vary depending on a frame structure and/or a random access configuration. A higher layer controls the preamble format.

TABLE 4

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4 (see Note) | 448 · $T_s$ | 4096 · $T_s$ |

Note:
Frame structure type 2 and special subframe configurations with UpPTS lengths 4384 · $T_s$ and 5120 · $T_s$ only assuming that the number of additional SC-FDMA symbols in UpPTS X in Table 4.2-1 is 0.

When the transmission of a random access preamble is triggered by a medium access control (MAC) layer, the transmission of the random access preamble is limited to specific time and frequency resources. Such resources are sequentially numbered in increasing order of subframe numbers within a radio frame and physical resource blocks of a frequency domain. Accordingly, a physical resource block and subframe having the lowest number within the radio frame correspond to an index 0. PRACH resources within the radio frame are indicated by a PRACH configuration index. The indexing may be configured like Table 5 and Table 6 below.

TABLE 5

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

TABLE 6

| PRACH configuration Index (See Table 5.7.1-3) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2)<br>(0, 0, 1, 2) | (0, 0, 0, 1)<br>(0, 0, 1, 1) | (0, 0, 0, 0)<br>(0, 0, 1, 0) | (0, 0, 0, 1)<br>(0, 0, 0, 2) | (0, 0, 0, 0)<br>(0, 0, 0, 1) | (0, 0, 0, 0)<br>(1, 0, 0, 0) | (0, 0, 0, 2)<br>(0, 0, 1, 1) |
| 7 | (0, 0, 0, 1)<br>(0, 0, 1, 1) | (0, 0, 0, 0)<br>(0, 0, 1, 0) | N/A | (0, 0, 0, 0)<br>(0, 0, 0, 2) | N/A | N/A | (0, 0, 0, 1)<br>(0, 0, 1, 0) |
| 8 | (0, 0, 0, 0)<br>(0, 0, 1, 0) | N/A | N/A | (0, 0, 0, 0)<br>(0, 0, 0, 1) | N/A | N/A | (0, 0, 0, 0)<br>(0, 0, 1, 1) |
| 9 | (0, 0, 0, 1)<br>(0, 0, 0, 2)<br>(0, 0, 1, 2) | (0, 0, 0, 0)<br>(0, 0, 0, 1)<br>(0, 0, 1, 1) | (0, 0, 0, 0)<br>(0, 0, 1, 0)<br>(1, 0, 0, 0) | (0, 0, 0, 0)<br>(0, 0, 0, 1)<br>(0, 0, 0, 2) | (0, 0, 0, 0)<br>(0, 0, 0, 1)<br>(1, 0, 0, 1) | (0, 0, 0, 0)<br>(1, 0, 0, 0)<br>(2, 0, 0, 0) | (0, 0, 0, 1)<br>(0, 0, 0, 2)<br>(0, 0, 1, 1) |
| 10 | (0, 0, 0, 0)<br>(0, 0, 1, 0)<br>(0, 0, 1, 1) | (0, 0, 0, 1)<br>(0, 0, 1, 0)<br>(0, 0, 1, 1) | (0, 0, 0, 0)<br>(0, 0, 1, 0)<br>(1, 0, 1, 0) | N/A | (0, 0, 0, 0)<br>(0, 0, 0, 1)<br>(1, 0, 0, 0) | N/A | (0, 0, 0, 0)<br>(0, 0, 0, 2)<br>(0, 0, 1, 0) |
| 11 | N/A | (0, 0, 0, 0)<br>(0, 0, 0, 1)<br>(0, 0, 1, 0) | N/A | N/A | N/A | N/A | (0, 0, 0, 1)<br>(0, 0, 1, 0)<br>(0, 0, 1, 1) |
| 12 | (0, 0, 0, 1)<br>(0, 0, 0, 2)<br>(0, 0, 1, 1)<br>(0, 0, 1, 2) | (0, 0, 0, 0)<br>(0, 0, 0, 1)<br>(0, 0, 1, 0)<br>(0, 0, 1, 1) | (0, 0, 0, 0)<br>(0, 0, 1, 0)<br>(1, 0, 0, 0)<br>(1, 0, 1, 0) | (0, 0, 0, 0)<br>(0, 0, 0, 1)<br>(0, 0, 0, 2)<br>(1, 0, 0, 2) | (0, 0, 0, 0)<br>(0, 0, 0, 1)<br>(1, 0, 0, 0)<br>(1, 0, 0, 1) | (0, 0, 0, 0)<br>(1, 0, 0, 0)<br>(2, 0, 0, 0)<br>(3, 0, 0, 0) | (0, 0, 0, 1)<br>(0, 0, 0, 2)<br>(0, 0, 1, 0)<br>(0, 0, 1, 1) |
| 13 | (0, 0, 0, 0)<br>(0, 0, 0, 2)<br>(0, 0, 1, 0)<br>(0, 0, 1, 2) | N/A | N/A | (0, 0, 0, 0)<br>(0, 0, 0, 1)<br>(0, 0, 0, 2)<br>(1, 0, 0, 2) | N/A | N/A | (0, 0, 0, 0)<br>(0, 0, 0, 1)<br>(0, 0, 0, 2)<br>(0, 0, 1, 1) |
| 14 | (0, 0, 0, 0)<br>(0, 0, 0, 1)<br>(0, 0, 1, 0)<br>(0, 0, 1, 1) | N/A | N/A | (0, 0, 0, 0)<br>(0, 0, 0, 1)<br>(0, 0, 0, 2)<br>(1, 0, 0, 0) | N/A | N/A | (0, 0, 0, 0)<br>(0, 0, 0, 2)<br>(0, 0, 1, 0)<br>(0, 0, 1, 1) |
| 15 | (0, 0, 0, 0)<br>(0, 0, 0, 1)<br>(0, 0, 0, 2)<br>(0, 0, 1, 1)<br>(0, 0, 1, 2) | (0, 0, 0, 0)<br>(0, 0, 0, 1)<br>(0, 0, 1, 0)<br>(0, 0, 1, 1)<br>(1, 0, 0, 1) | (0, 0, 0, 0)<br>(0, 0, 1, 0)<br>(1, 0, 0, 0)<br>(1, 0, 1, 0)<br>(2, 0, 0, 0) | (0, 0, 0, 0)<br>(0, 0, 0, 1)<br>(0, 0, 0, 2)<br>(1, 0, 0, 1)<br>(1, 0, 0, 2) | (0, 0, 0, 0)<br>(0, 0, 0, 1)<br>(1, 0, 0, 0)<br>(1, 0, 0, 1)<br>(2, 0, 0, 1) | (0, 0, 0, 0)<br>(1, 0, 0, 0)<br>(2, 0, 0, 0)<br>(3, 0, 0, 0)<br>(4, 0, 0, 0) | (0, 0, 0, 0)<br>(0, 0, 0, 1)<br>(0, 0, 0, 2)<br>(0, 0, 1, 0)<br>(0, 0, 1, 1) |
| 16 | (0, 0, 0, 1)<br>(0, 0, 0, 2)<br>(0, 0, 1, 0)<br>(0, 0, 1, 1)<br>(0, 0, 1, 2) | (0, 0, 0, 0)<br>(0, 0, 0, 1)<br>(0, 0, 1, 0)<br>(0, 0, 1, 1)<br>(1, 0, 1, 1) | (0, 0, 0, 0)<br>(0, 0, 1, 0)<br>(1, 0, 0, 0)<br>(1, 0, 1, 0)<br>(2, 0, 1, 0) | (0, 0, 0, 0)<br>(0, 0, 0, 1)<br>(0, 0, 0, 2)<br>(1, 0, 0, 0)<br>(1, 0, 0, 2) | (0, 0, 0, 0)<br>(0, 0, 0, 1)<br>(1, 0, 0, 0)<br>(1, 0, 0, 1)<br>(2, 0, 0, 0) | N/A | N/A |
| 17 | (0, 0, 0, 0)<br>(0, 0, 0, 1)<br>(0, 0, 0, 2)<br>(0, 0, 1, 0)<br>(0, 0, 1, 2) | (0, 0, 0, 0)<br>(0, 0, 0, 1)<br>(0, 0, 1, 0)<br>(0, 0, 1, 1)<br>(1, 0, 0, 0) | N/A | (0, 0, 0, 0)<br>(0, 0, 0, 1)<br>(0, 0, 0, 2)<br>(1, 0, 0, 0)<br>(1, 0, 0, 1) | N/A | N/A | N/A |
| 18 | (0, 0, 0, 0)<br>(0, 0, 0, 1)<br>(0, 0, 0, 2)<br>(0, 0, 1, 0)<br>(0, 0, 1, 1)<br>(0, 0, 1, 2) | (0, 0, 0, 0)<br>(0, 0, 0, 1)<br>(0, 0, 1, 0)<br>(0, 0, 1, 1)<br>(1, 0, 0, 1)<br>(1, 0, 1, 1) | (0, 0, 0, 0)<br>(0, 0, 1, 0)<br>(1, 0, 0, 0)<br>(1, 0, 1, 0)<br>(2, 0, 0, 0)<br>(2, 0, 1, 0) | (0, 0, 0, 0)<br>(0, 0, 0, 1)<br>(0, 0, 0, 2)<br>(1, 0, 0, 0)<br>(1, 0, 0, 1)<br>(1, 0, 0, 2) | (0, 0, 0, 0)<br>(0, 0, 0, 1)<br>(1, 0, 0, 0)<br>(1, 0, 0, 1)<br>(2, 0, 0, 0)<br>(2, 0, 0, 1) | (0, 0, 0, 0)<br>(1, 0, 0, 0)<br>(2, 0, 0, 0)<br>(3, 0, 0, 0)<br>(4, 0, 0, 0)<br>(5, 0, 0, 0) | (0, 0, 0, 0)<br>(0, 0, 0, 1)<br>(0, 0, 0, 2)<br>(0, 0, 1, 0)<br>(0, 0, 1, 1)<br>(1, 0, 0, 2) |
| 19 | N/A | (0, 0, 0, 0)<br>(0, 0, 0, 1)<br>(0, 0, 1, 0)<br>(0, 0, 1, 1)<br>(1, 0, 0, 0)<br>(1, 0, 1, 0) | N/A | N/A | N/A | N/A | (0, 0, 0, 0)<br>(0, 0, 0, 1)<br>(0, 0, 0, 2)<br>(0, 0, 1, 0)<br>(0, 0, 1, 1)<br>(1, 0, 1, 1) |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1)<br>(0, 0, 1, 1) | (0, 0, 0, 0)<br>(0, 0, 1, 0) | N/A | (0, 0, 0, 1)<br>(1, 0, 0, 1) | (0, 0, 0, 0)<br>(1, 0, 0, 0) | N/A | (0, 0, 0, 1)<br>(0, 0, 1, 0) |
| 26/36 | (0, 0, 0, 1)<br>(0, 0, 1, 1)<br>(1, 0, 0, 1) | (0, 0, 0, 0)<br>(0, 0, 1, 0)<br>(1, 0, 0, 0) | N/A | (0, 0, 0, 1)<br>(1, 0, 0, 1)<br>(2, 0, 0, 1) | (0, 0, 0, 0)<br>(1, 0, 0, 0)<br>(2, 0, 0, 0) | N/A | (0, 0, 0, 1)<br>(0, 0, 1, 0)<br>(1, 0, 0, 1) |
| 27/37 | (0, 0, 0, 1)<br>(0, 0, 1, 1)<br>(1, 0, 0, 1)<br>(1, 0, 1, 1) | (0, 0, 0, 0)<br>(0, 0, 1, 0)<br>(1, 0, 0, 0)<br>(1, 0, 1, 0) | N/A | (0, 0, 0, 1)<br>(1, 0, 0, 1)<br>(2, 0, 0, 1)<br>(3, 0, 0, 1) | (0, 0, 0, 0)<br>(1, 0, 0, 0)<br>(2, 0, 0, 0)<br>(3, 0, 0, 0) | N/A | (0, 0, 0, 1)<br>(0, 0, 1, 0)<br>(1, 0, 0, 1)<br>(1, 0, 1, 0) |

TABLE 6-continued

| PRACH configuration Index (See Table 5.7.1-3) | UL/DL configuration (See Table 4.2-2) | | | | | | |
|---|---|---|---|---|---|---|---|
| | 0 | 1 | 2 | 3 | 4 | 5 | 6 |
| 28/38 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| 29/39 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| | (2, 0, 1, 1) | (2, 0, 1, 0) | | (5, 0, 0, 1) | (5, 0, 0, 0) | | (2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| 46 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| 47 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| | (1, 0, 1, 0) | | | (3, 0, 0, 0) | | | (3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| 54 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| 55 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| 56 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| 57 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| | (2, 0, 1, *) | (2, 0, 1, *) | (2, 0, 1, *) | (5, 0, 0, *) | (5, 0, 0, *) | (5, 0, 0, *) | (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

NOTE:
* UpPTS

In the case of non-BL/CE UEs, a single PRACH configuration having $n_{PRBoffset}^{RA}$ given by a higher layer parameter (prach-FrequencyOffset) may be present. In contrast, in the case of BL/CE UEs, a PRACH configuration having a PRACH configuration index (prach-ConfigurationIndex), a PRACH frequency offset $\bar{n}_{PRBoffset}^{RA}$ (prach-FrequencyOffset), a PRACH repetition number per attempt $N_{rep}^{PRACH}$ (numRepetitionPerPreambleAttempt), PRACH starting subframe periodicity $N_{start}^{PRACH}$ (prach-StartingSubframe) may be configured with respect to each PRACH coverage enhancement level by a higher layer. Furthermore, the PRACHs of the preamble formats 0-3 are repeated and transmitted by $N_{rep}^{PRACH} \geq 1$. The PRACH of the preamble format 4 is transmitted only once.

Furthermore, with respect to BL/CE UEs and each PRACH coverage enhancement level, if frequency hopping is possible by a higher layer parameter (prach-HoppingConfig) with respect to a PRACH configuration, the value of the parameter depends on a system frame number (SFN) and a PRACH configuration index. The corresponding value is given by Equation 2.

$$n_{PRBoffset}^{RA} = \qquad \text{(Equation 2)}$$

$$\begin{cases} \overline{n}_{PRBoffset}^{RA} & \text{if } n_f \bmod 2 = 0 \\ (\overline{n}_{PRBoffset}^{RA} + f_{PRB,hop}^{PRACH}) \bmod N_{RB}^{UL} & \text{if } n_f \bmod 2 = 1 \end{cases}$$

$$n_{PRBoffset}^{RA} =$$

$$\begin{cases} \overline{n}_{PRBoffset}^{RA} & \text{if } \left\lfloor \dfrac{n_f \bmod 4}{2} \right\rfloor = 0 \\ (\overline{n}_{PRBoffset}^{RA} + f_{PRB,hop}^{PRACH}) \bmod N_{RB}^{UL} & \text{if } \left\lfloor \dfrac{n_f \bmod 4}{2} \right\rfloor = 1 \end{cases}$$

In Equation 2, the above equation is an equation when a PRACH resource occurs in all radio frames when the PRACH configuration index is calculated according to Table 5 or Table 6. The following equation is an equation in other cases. In Equation 2, of means a system frame number, and $f_{PRB,hop}^{PRACH}$ means prachHoppingOffset, that is, a cell-specific higher layer parameter. In contrast, if frequency hopping is impossible with respect to a PRACH configuration, $n_{PRBoffset}^{RA} = \overline{n}_{PRBoffset}^{RA}$.

In the case of the frame structure type 1 of the preamble formats 0-3, if the frame structure type is many per subframe with respect to a PRACH configuration, one random access resource may be present.

Table 5 shows preamble formats according to Table 4, and shows subframes in which random access preamble transmission is allowed with respect to the configurations given in the frame structure type 1. The start of a random preamble is aligned with the start of a corresponding uplink subframe in $N_{TA}=0$ assumed by a UE. In the case of PRACH configurations 0, 1, 2, 15, 16, 17, 18, 31, 32, 33, 34, 47, 48, 49, 50 and 63, a UE may assume that an absolute value of a relative time difference between the radio frame of a current cell and a target cell is smaller than 153600 $T_s$ due to a handover object. In this case, the first physical resource block $n_{PRB}^{RA}$ allocated to a PRACH opportunity taken into consideration in the preamble formats 0, 1, 2, and 3 may be defined as $n_{PRB}^{RA} = n_{PRBoffset}^{RA}$.

In contrast, in the case of the frame structure type 2 of the preamble formats 0-4, a plurality of random access resources may be present in an uplink subframe with respect to each PRACH configuration. Table 7 shows PRACH configurations allowed in the frame structure type 2.

TABLE 7

| PRACH configuration Index | Preamble Format | Density Per 10 ms $D_{RA}$ | Version $r_{RA}$ |
| --- | --- | --- | --- |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

In Table 7, the configuration index corresponds to a specific combination of preamble formats, a PRACH density value ($D_{RA}$) and a version index ($r_{RA}$). In the case of the frame structure type 2 having PRACH configuration indices 0, 1, 2, 20, 21, 22, 30, 31, 32, 40, 41, 42, 48, 49, 50, or PRACH configuration indices 51, 53, 54, 55, 56 and 57 in the uplink/downlink configurations 3, 4, and 5, a UE may assume that an absolute value of a relative time difference between a radio frame of a current cell and a target cell is smaller than $153600\text{-}_{T_s}$ due to a handover object.

Table 6 lists the mapping of physical resources for various random access opportunities necessary for a specific PRACH density value ($D_{RA}$). Each quadruple ($f_{RA}$, $t_{RA}^{(0)}$, $t_{RA}^{(1)}$, $t_{RA}^{(2)}$) of the format indicate the location of a specific random access resource. In this case, $f_{RA}$ indicates a frequency resource index within a considered time instance.

Furthermore, $t_{RA}^{(0)}=0,1,2$ indicates whether a random access resource reoccurs in each of all radio frames, even radio frames, or odd radio frames. Furthermore, $t_{RA}^{(1)}=0,1$ indicates whether each random access resource is positioned in a first half frame or a second half frame. Furthermore, $t_{RA}^{(2)}$ indicates the number of uplink subframes where a preamble starts when counting starts from 0 in the first uplink subframe between two contiguous downlink-to-uplink switch points other than a preamble format 4 marked by *.

Furthermore, the start of the random access preamble formats 0-3 is aligned with the start of an uplink subframe in $N_{TA}=0$ assumed by a UE. In contrast, the random access preamble format 4 starts at $4832_{T_s}$ prior to the end of the UpPTS of the UE. The UpPTS refers to uplink frame timing of the UE that assumes $N_{TA}=0$.

Random access opportunities for each PRACH configuration need to be allocated to a next frequency first allocated to the time only when time multiplexing is not sufficient to maintain all the opportunities of a PRACH configuration necessary for a specific density value (DRA) while all the opportunities do not overlap temporally.

In the case of the preamble formats 0-3, frequency multiplexing may be performed in accordance with Equation 3.

$$n_{PRB}^{RA} = \begin{cases} n_{PRBoffset}^{RA} + 6\left\lfloor \frac{f_{RA}}{2} \right\rfloor, & \text{if } f_{RA} \bmod 2 = 0 \\ N_{RB}^{UL} - 6 - n_{PRBoffset}^{RA} - 6\left\lfloor \frac{f_{RA}}{2} \right\rfloor, & \text{otherwise} \end{cases} \quad \text{(Equation 3)}$$

In Equation 3, $N_{RB}^{UL}$ indicates the number of uplink resource blocks, $n_{PRB}^{RA}$ indicates the first physical resource block allocated to a considered PRACH opportunity, and $n_{PRBoffset}^{RA}$ indicates the first physical resource block available for a PRACH.

In the case of the preamble format 4, frequency multiplexing may be performed in accordance with Equation 4.

In Equation 4, of indicates a system frame number. $N_{SP}$ indicates the number of switch points from the downlink to the uplink within a radio frame.

Furthermore, in the case of BL/CE UEs, only a subset of subframes allowed for preamble transmission may be allowed as start subframes for $N_{rep}^{PRACH}$ repetition. Start subframes allowed for a PRACH configuration may be defined as follows.

Subframes allowed for the transmission of a preamble for a PRACH configuration may be numbered like $n_{sf}^{RA}=0, \ldots N_{sf}^{RA}-1$. In this case, $n_{sf}^{RA}=0$ and $n_{sf}^{RA}=N_{sf}^{RA}-1$ correspond to two subframes allowed for the transmission of a preamble having the smallest and the greatest absolute subframe number $n_{sf}^{abs}$, respectively.

If the PRACH starting subframe periodicity $N_{start}^{PRACH}$ is not provided by a higher layer, from the viewpoint of subframes allowed for preamble transmission, the periodicity of an allowed start subframe is $N_{rep}^{PRACH}$. The allowed start subframe defined across $N_{sf}^{RA}=0, \ldots N_{sf}^{RA}-1$ is given by $jN_{rep}^{PRACH}$ (wherein j=0, 1, 2, ...).

If the PRACH starting subframe periodicity $N_{start}^{PRACH}$ is provided by a higher layer, this indicates the periodicity of an allowed start subframe from the viewpoint of subframes allowed for preamble transmission. An allowed start subframe defined across $n_{sf}^{RA}=0, \ldots N_{sf}^{RA}-1$ is given by $jN_{start}^{PRACH}+N_{rep}^{PRACH}$ (wherein j=0, 1, 2, ...).

If the PRACH starting subframe periodicity $N_{start}^{PRACH}$ is provided by a higher layer, It is allowed that a start subframe having an absolute subframe number $n_{sf}^{abs}<10240-N_{rep}^{PRACH}$ is not present.

In this case, each random access preamble occupies a bandwidth corresponding to 6 consecutive resource blocks for two frame structures.

Next, preamble sequence generation related to a PRACH is described more specifically. A random access preamble may be generated from the Zadoff-Chu sequences of a zero correlation zone generated from one or more root Zadoff-Chu sequences. A network configures a set of preamble sequences allowed to be used by a UE.

There may be 64 preambles available for each cell. A set of 64 preamble sequences in one cell may be discovered by including all the available cyclic shifts of a root Zadoff-Chu sequence having a logical index RACH_ROOT_SEQUENCE in increasing order of cyclic shifts. In this case, RACH_ROOT_SEQUENCE may be broadcasted as part of system information. If 64 preambles cannot be generated from the root Zadoff-Chu sequence of a UE, additional preamble sequences may be obtained from root sequences having consecutive logical indices until all the 64 sequences are discovered.

The logical root sequence order circulates, and a logical index 0 is consecutive up to 837. The relation between a logical root sequence index and a physical root sequence index (u) is given by Table 8 and Table 9 with respect to the preamble formats 0-3 and 4, respectively.

$$n_{PRB}^{RA} = \begin{cases} 6f_{RA}, & \text{if } (n_f \bmod 2) \times (2-N_{SP}) + t_{RA}^{(1)}) \bmod 2 = 0 \\ N_{RB}^{UL} - 6(f_{RA}+1), & \text{otherwise} \end{cases} \quad \text{(Equation 4)}$$

TABLE 8

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779, 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

TABLE 9

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | | |

A u-th root Zadoff-Chu sequence is defined by Equation 5.

$$x_u(n) = e^{-j\frac{\pi u n(n+1)}{N_{ZC}}}, 0 \leq n \leq N_{ZC} - 1 \quad \text{(Equation 5)}$$

In Equation 5, the Zadoff-Chu sequence of a length NZC is given by Table 10.

TABLE 10

| Preamble format | $N_{ZC}$ |
|---|---|
| 0-3 | 839 |
| 4 | 139 |

Random access preambles having the zero correlation zones of a length $N_{CS}-1$ from the u-th root Zadoff-Chu sequence are defined by cyclic shifts according to Equation 6. The cyclic shifts are given by Equation 7.

$$x_{u,v}(n) = x_u((n + C_v) \bmod N_{ZC}) \quad \text{(Equation 6)}$$

$$C_v = \begin{cases} vN_{CS} & v = 0, 1, \ldots, \lfloor N_{ZC}/N_{CS}\rfloor - 1, N_{CS} \neq 0 \text{ for unrestricted sets} \\ 0 & N_{CS} = 0 \text{ for unrestricted sets} \\ d_{start}\lfloor v/n_{shift}^{RA}\rfloor + (v \bmod n_{shift}^{RA})N_{CS} & v = 0, 1, \ldots, n_{shift}^{RA} n_{group}^{RA} + \bar{n}_{shift}^{RA} - 1 \text{ for restricted sets} \end{cases} \quad \text{(Equation 7)}$$

In Equation 9, $N_{CS}$ is given by Table 11 and 12 with respect to the preamble formats 0-3 and 4, respectively.

TABLE 11

| zeroCorrelationZoneConfig | $N_{CS}$ value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 12

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

In this case, a parameter "zeroCorrelationZoneConfig" is provided by a higher layer. Furthermore, a parameter "High-speed-flag" provided by a higher layer determines whether an unrestricted set or a restricted set is used.

Furthermore, a variable $d_u$ is a cyclic shift corresponding to the Doppler shift of a magnitude $1/T_{SEQ}$, and is given by Equation 8.

$$d_u = \begin{cases} p & 0 \leq p < N_{ZC}/2 \\ N_{ZC} - p & \text{otherwise} \end{cases} \quad \text{(Equation 8)}$$

In Equation 8, p is the smallest integer satisfying (pu)mod$N_{ZC}$=1, not a negative number. Parameters for the restricted sets of cyclic shifts depend on $d_u$.

In the case of $N_{CS} \leq d_u < N_{ZC}/3$, the parameters are given by Equation 9.

$$n_{shift}^{RA} = \lfloor d_u/N_{CS}\rfloor$$
$$d_{start} = 2d_u + n_{shift}^{RA} N_{CS}$$
$$n_{group}^{RA} = \lfloor N_{ZC}/d_{start}\rfloor$$
$$\bar{n}_{shift}^{RA} = \max(\lfloor N_{ZC} - 2d_u - n_{group}^{RA} d_{start}\rfloor/N_{CS}\rfloor, 0) \quad \text{[Equation 9]}$$

Furthermore, in the case of $N_{ZC}/3 \leq d_u \leq (N_{ZC}-N_{CS})/2$, the parameters are given by Equation 10.

$$n_{shift}^{RA} = \lfloor (N_{ZC} - 2d_u)/N_{CS}\rfloor$$
$$d_{start} = N_{ZC} - 2d_u + n_{shift}^{RA} N_{CS}$$
$$n_{group}^{RA} = \lfloor d_u/d_{start}\rfloor$$
$$\bar{n}_{shift}^{RA} = \min(\max(\lfloor (d_u - n_{group}^{RA} d_{start})/N_{CS}\rfloor, 0), n_{shift}^{RA}) \quad \text{[Equation 10]}$$

Furthermore, in the case of all other values of $d_u$, a cyclic shift is not present in the restricted sets.

Next, baseband signal generation related to a PRACH is described more specifically. A time-continuous random access signal s(t) is defined by Equation 11.

$$s(t) = \beta_{PRACH} \sum_{k=0}^{N_{ZC}-1} \sum_{n=0}^{N_{ZC}-1} x_{u,v}(n) \cdot e^{-j\frac{2\pi n k}{N_{ZC}}} \cdot e^{j2\pi(k+\varphi+K(k_0+\frac{1}{2}))\Delta f_{RA}(t-T_{CP})}$$

In Equation 11, $0 \leq t < T_{SEQ} + T_{CP}$, $k_0 = n_{PRB}^{RA} N_{sc}^{RB} - N_{RB}^{UL} N_{sc}^{RB}/2$, and $\beta_{PRACH}$ indicates an amplitude scaling factor for securing transmission power ($P_{PRACH}$). In the frequency domain, a position is controlled by the parameter $n_{PRB}^{RA}$. Furthermore, a coefficient $K = \Delta f/\Delta f/\Delta f_{RA}$ indicates a difference in the subcarrier spacing between a random access preamble and uplink data transmission. In this case, the variable $\Delta f_{RA}$ indicates the subcarrier spacing of the random access preamble. The variable $\varphi$ indicates a fixed offset that determines a position on the frequency domain of the random access preamble within physical resource blocks. The two parameters are given by Table 13.

TABLE 13

| Preamble format | $\Delta f_{RA}$ | $\varphi$ |
|---|---|---|
| 0-3 | 1250 Hz | 7 |
| 4 | 7500 Hz | 2 |

Next, modulation and upconversion related to a PRACH are described. The modulation and upconversion of a complex-valued SC-FDMA baseband signal or complex-valued PRACH baseband signal for each antenna port into a carrier frequency may be represented like FIG. 6.

Figure 6:
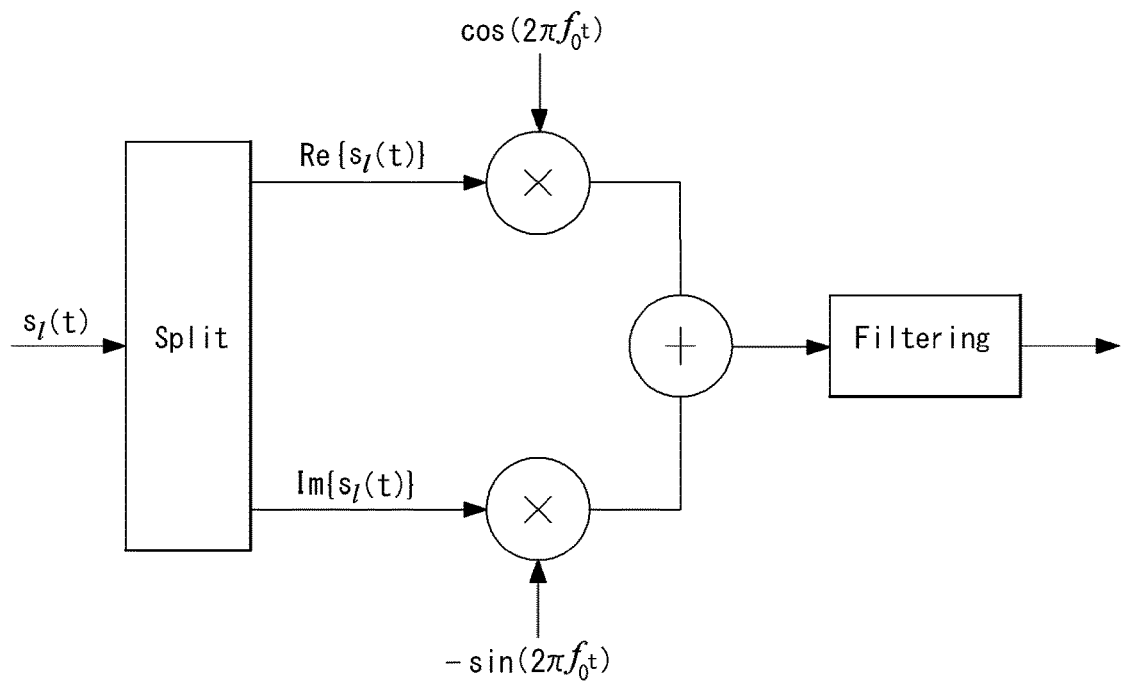
FIG. 6 illustrates uplink modulation to which a method proposed in this specification may be applied.

FIG. 6 illustrates uplink modulation to which a method proposed in this specification may be applied.

In this case, requirements for filtering required prior to transmission may be previously defined on the standard.

In the case of a legacy LTE system, a UE may perform an initial access procedure on a base station using a contention-based method or a non-contention-based method. Specifically, the base station may allocate some of 64 Zadoff-Chu sequences for the contention-based method, and may allocate the remainder for the non-contention-based method. In this case, the UE may attempt initial access to the base station using one of the two methods depending on its initial access environment (or state, situation).

For example, if a UE is powered on and newly accessed (e.g., power-on) or switches from an RRC Idle state to an RRC connected state, the UE may attempt initial access using the contention-based method. In contrast, for another example, if a UE performs handover between base stations or if a UE has received downlink data (DL data), but does not perform synchronization, the UE may attempt initial access using the non-contention-based method.

If a UE attempts initial access using the non-contention-based method, a base station may notify the UE of information on the type of sequence (e.g., preamble sequence) to be used by the UE through a downlink control channel (e.g., PDCCH), the location of a transmission resource, etc. Accordingly, the corresponding UE can complete the initial access procedure without a contention with other UEs.

In contrast, if a UE performs initial access using the contention-based method, in the legacy LTE system, the UE may complete initial access to a base station after completing contention resolution through a total of four-step processes (i.e., four-step RACH procedure). Specifically, in the legacy LTE system, the four-step RACH procedure may include a first step (MSG 1) of transmitting, by a UE, a PRACH preamble to a base station, a second step (MSG 2) of transmitting, by the base station, a PRACH response including a temporary identifier (e.g., T-RNTI), an uplink grant, etc. to the UE, a third step (MSG 3) of requesting, by the UE, an RRC connection (RRC connection request) from the base station, and a fourth step of forwarding, by the base station, an RRC connection setup complete (i.e., contention resolution message) to the UE.

However, a simplified initial access procedure may need to be taken into consideration because the completion of a rapid initial access procedure may be necessary for an NR system. In this case, the simplified initial access procedure may mean a simplified RACH procedure.

For example, the simplified initial access procedure may be performed through the process of the second step. Specifically, for the simplified initial access procedure, a method of configuring a new MSG 1 by combining the MSG 1 and MSG 3 described in the four-step RACH procedure of the legacy LTE system and configuring a new MSG 2 by combining the MSG 2 and the MSG 4 may be taken into consideration. That is, the RACH procedure of the second step may include a first step (new MSG 1) of transmitting, by a UE, a PRACH preamble or a PRACH preamble and data (e.g., BSR, UE identifier) to a base station and a second step (new MSG 2) of transmitting, by the base station, an uplink grant, a contention resolution message, etc.

Furthermore, in the NR system, a radio access network (RAN) controlled state may be defined in addition to the RRC Idle state and the RRC connected state. The RAN controlled state may correspond to the middle state of the RRC Idle state and the RRC connected state, and may mean the state in which a base station maintains the identifier (ID) of a UE without releasing the ID.

Accordingly, when the simplified initial access procedure and/or the RAN controlled state in the NR system is taken into consideration, in order to minimize latency, a UE can rapidly perform an initial access procedure on a base station.

Hereinafter, in this specification, a method(s) for rapidly performing initial access by a UE in an NR system, such as that described above, is described.

Specifically, this specification proposes a method of performing initial access between a base station and a UE by indicating (or selecting) a specific PRACH configuration among one or more PRACH configurations adaptively (i.e., depending on a network situation). In relation to this, this specification proposes detailed configuration methods related to a PRACH configuration for initial access.

Unlike in a case where a UE transmits only a preamble for initial access in the legacy LTE system (i.e., known RACH procedure), in the case of a simplified RACH procedure, a method of transmitting, by a UE, additional information in addition to a preamble may be taken into consideration. That is, a UE may transmit a PRACH, including a preamble and/or additional information (e.g., data), to a base station by taking into consideration rapid initial access. If a UE transmits additional information along with a preamble, it may be efficient in terms of signaling overhead because another signaling procedure for transmitting the corresponding information is not necessary.

In this case, configurations related to the transmission of a preamble and/or additional information, such as those described above, may be defined as (or correspond to) to different PRACH configurations. In this case, the PRACH configuration may also be referred to as a PRACH type, a PRACH transmission type, a PRACH transmission format, a PRACH preamble format or the like. An example of a structure corresponding to each PRACH configuration may be the same as FIG. 7.

Figure 7:
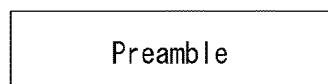
FIG. 7 illustrates examples of a physical random access channel (PRACH) configuration to which a method proposed in this specification may be applied.
Figure 7:
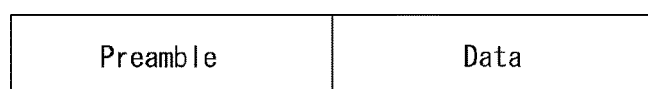
Figure 7:
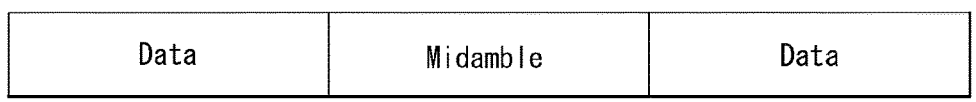
Figure 7:

FIG. 7 illustrates examples of a PRACH configuration to which a method proposed in this specification may be applied.

Referring to FIG. 7, for initial access, a UE may transmit only a preamble (hereinafter referred to as a "preamble only") as in FIG. 7(a) or may transmit a preamble and data (i.e., data transmission region) together (hereinafter referred to as a "preamble+data") as in FIG. 7(b).

Alternatively, the UE may transmit a sequence (i.e., RACH procedure-related sequence) in the form of a midamble between two data transmission regions (hereinafter referred to as a "data+midamble+data") as in FIG. 7(c). In this case, the midamble may mean a preamble transmitted in the middle of the transmission of the data.

Alternatively, the UE may transmit additional information by transmitting another preamble after as preamble (hereinafter referred to as a "preamble+preamble") as in FIG. 7(d). For example, the UE may transmit, to a base station, a first preamble indicating a PRACH sequence and a second preamble indicating additional information used in a PRACH procedure.

In this case, configurations, such as those described above, may be classified into different PRACH configurations. For example, structures, such as FIGS. 7(a), (b), (c), and (d), may be configured with PRACH configurations 0, 1, 2, and 3. Indices (e.g., PRACH configuration indices) may be configured in the respective structures.

In this case, in the data region transmitted together with the preamble (or midamble), the UE may transmit a contention resolution identifier, a buffer status report (BSR), an RRC connection request, etc. That is, the UE may transmit, to a base station, information related to an initial access procedure (i.e., RACH procedure) through the corresponding data region.

Furthermore, if an analog beamforming operation supported in an NR system is taken into consideration, a UE may transmit information related to the beam of a base station and/or the UE through the data region. For example, if beam reciprocity (or beam correspondence) is not established, a UE may transmit information on the downlink Tx beam (DL Tx beam) of a base station (e.g., gNB) through the data region.

Furthermore, in various embodiments of the present invention, a base station may assign (or indicate) the type of information (i.e., data type) to be transmitted in the above-described data region through downlink control information (DCI) of a downlink control channel (e.g., PDCCH). Furthermore, the base station may assign that one of a plurality of PRACH configurations (i.e., PRACH transmission structures) is selected and transmitted in addition to the data type. In other words, the base station may indicate that a specific PRACH configuration is selected among pre-configured PRACH configurations (e.g., "preamble only", "preamble+data", "preamble+preamble, "data+midamble+data") and the selected specific PRACH configuration is used with respect to a UE.

Hereinafter, a method of assigning (or indicating), by a base station, a specific PRACH configuration and/or the type of information is described more specifically.

In general, if a channel situation is not good, the structure in which only a preamble is transmitted (i.e., PRACH configuration of the "preamble only" form) may be configured to be used when a plurality of UEs attempts access to a corresponding base station. The reason why a UE transmits a preamble and additional information together although a channel situation is not good is that an essential preamble may be lost in a RACH procedure.

Accordingly, the structure in which a preamble and additional information are transmitted together (i.e., PRACH configuration of the "preamble+data", "preamble+preamble" or "data+midamble+data" form) may be configured to be used only when a channel situation is good by taking into consideration the decoding, transmission and reception quality of the corresponding information, a transmission time, etc.

As described above, a base station may be configured to indicate a proper PRACH configuration with respect to a UE depending on a network situation, such as channel quality with a UE(s), the number of UEs that perform attempt access.

Alternatively, a PRACH default transmission structure (e.g., default PRACH configuration) to be used in a PRACH procedure may be previously configured on a system. However, in this case, if a base station indicates a separate PRACH configuration with respect to a UE, the corresponding UE may perform a PRACH procedure based on the indicated PRACH configuration.

For example, a PRACH default transmission structure (e.g., default PRACH configuration) may be configured in the "preamble+data" form on a system. In this case, a base station may indicate that a preamble only is transmitted depending on a situation (i.e., network environment) with respect to a UE. Specifically, if a channel situation is not good or a plurality of UEs attempts access at the same time, the situation in which decoding in a base station is difficult may continue because information of a data region is damaged. In this case, the base station may indicate (or configure) that a UE(s) attempting access to the corresponding base station using a cell-specific DCI should attempt initial access using a PRACH configuration corresponding to the "preamble only" structure. Alternatively, in the case of a UE(s) having only synchronization, a base station may configure that the corresponding UE(s) attempt initial access using a PRACH configuration corresponding to the "preamble only" structure.

In this case, if the base station is aware of the identifier, etc. of the UE, a configuring method using a UE-specific manner in addition to a cell-specific manner may also be taken into consideration. Furthermore, in this case, the base station may classify resource regions (i.e., PRACH transmission regions) in which different PRACH configurations are transmitted, and may notify the UE of information on the corresponding resource region along with the PRACH configuration to be transmitted.

Furthermore, a method of assigning (or indicating) a data type in a UE-specific manner may also be taken into consideration. For example, if a UE performs initial access in order to transmit uplink control information to a base station, the corresponding UE may be configured to transmit only information in addition to information on a BSR through the above-described data region.

In this case, the base station may separately assign the type of data one by one or may configure a plurality of sets (i.e., a plurality of data sets) based on a combination between a plurality of data types and may indicate (or configure) that the UE should transmit one of the sets through a downlink control channel (e.g., PDCCH) (i.e., DCI). In other words, data transmitted through the data region may be grouped into a plurality of sets depending on the correlation.

In this case, the base station may transmit, to the UE, information indicating the data set through the DCI. In other words, the UE may receive, from the base station, configuration information indicating one or more data sets, and may transmit data, corresponding to a data set indicated through the DCI, in the above-described data region. If such a method is used, there is an advantage in that the coding rate of a data region can be improved because the number of bits of data necessary for transmission is reduced in the state in which the size of a container used for transmission has been fixed.

Figure 8:
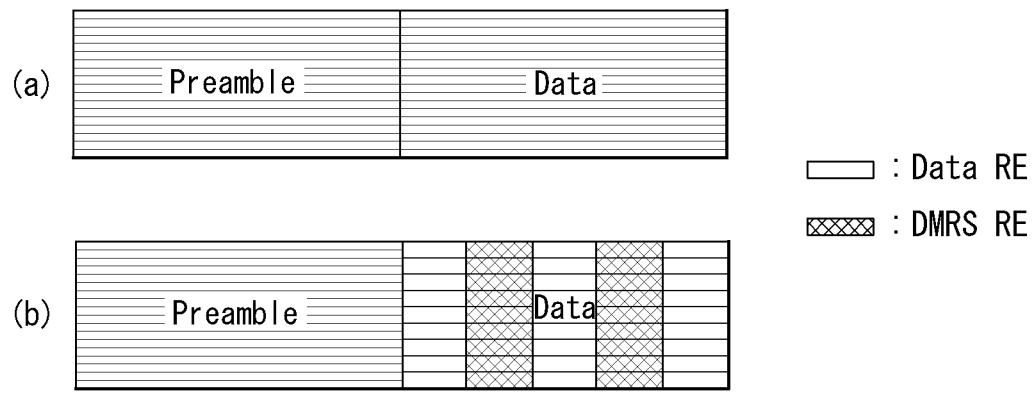
FIG. 8 illustrates examples of the transmission structure of a preamble and data to which a method proposed in this specification may be applied.

Furthermore, in various embodiments of the present invention, if a UE attempts initial access based on a PRACH configuration in which a preamble and data are transmitted together (e.g., if the UE attempts initial access using the "preamble+data" structure), as shown in FIG. 8, a numerology (e.g., subcarrier spacing, a CP length) applied to the preamble and data may be different. In other words, a numerology configuration applied to the preamble and a numerology configuration applied to the data may not be the same. In this case, a base station may transmit additional indication information for the channel estimation of a data region to the UE through a downlink control channel (e.g., PDCCH) (i.e., DCI).

FIG. 8 illustrates examples of the transmission structure of a preamble and data to which a method proposed in this specification may be applied. FIG. 8 is merely for convenience of description and does not limit the scope of the present invention.

Referring to FIG. 8, it is assumed that in an initial access procedure, a UE transmits a preamble and data together through a PRACH. The method described in FIG. 8 may be applied to the structure in which a midamble and data are transmitted together in addition to the structure in which a preamble and data are transmitted together.

Furthermore, FIG. 8(a) illustrates a case where the same subcarrier spacing is applied to a preamble and data, and FIG. 8(b) illustrates a case where different subcarrier spacings are applied to a preamble and data. For example, referring to the spacing of a vertical axis space in FIG. 8(b), a subcarrier spacing applied to the data may be configured to be twice the subcarrier spacing applied to the preamble.

If the same subcarrier spacing is applied to a preamble and a data region as in FIG. 8(a), a UE may transmit only data in the data region without a demodulation reference signal (DMRS). In this case, a base station may perform channel estimation using the preamble.

In contrast, if different subcarrier spacings are applied to a preamble and a data region as in FIG. 8(b), a base station cannot perform channel estimation on the data region using the preamble. In this case, the base station may indicate that a UE should transmit a DMRS together in the data region through a downlink control channel (e.g., PDCCH) (i.e., DCI). For example, the base station may transmit, to the UE, information indicating the transmission location of a DMRS, a DMRS transmission number, the sequence of the DMRS, etc. Accordingly, the corresponding base station may perform channel estimation on the data region using the DMRS transmitted along with the data.

Furthermore, in the case of the legacy LTE system, a PRACH may be configured with a plurality of formats depending on coverage. In relation to this, in various embodiments of the present invention, in the case of an NR system, a plurality of formats may be configured within each of the PRACH configurations (i.e., PRACH transmission structures). Furthermore, for optimization, a method of adjusting the length of a preamble within one format (or one PRACH configuration) may be taken into consideration. In this case, a base station may transmit, to a UE, information (e.g., the number of symbols of a data region) for adjusting the length of a preamble through a downlink control channel (e.g., PDCCH) (i.e., DCI). In this case, it may be advantageous in terms of synchronization if the number of bits allocated to the data region is small (i.e., if the length of a preamble is lengthily configured).

Figure 9:
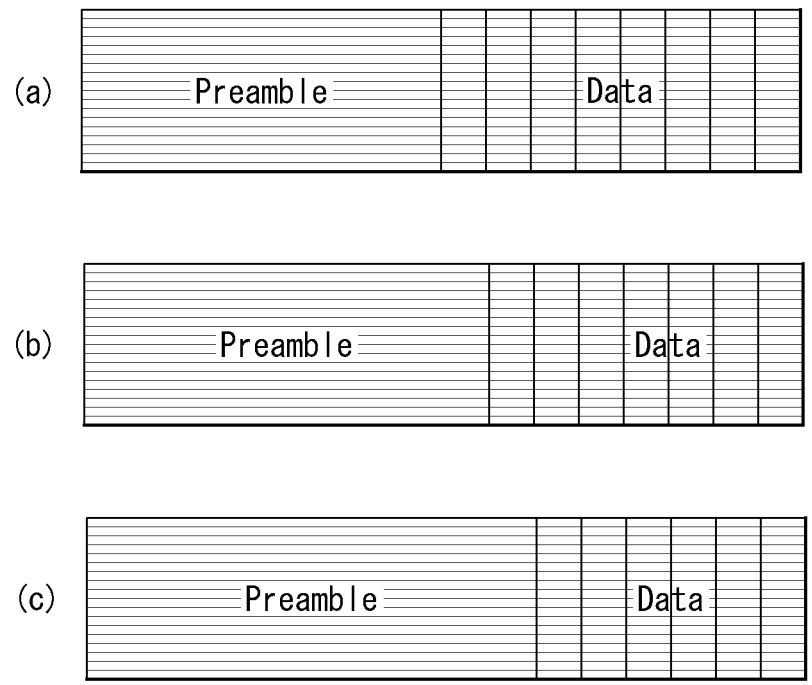
FIG. 9 illustrates other examples of the transmission structure of a preamble and data to which a method proposed in this specification may be applied.

FIG. 9 illustrates other examples of the transmission structure of a preamble and data to which a method proposed in this specification may be applied. FIG. 9 is merely for convenience of description and does not limit the scope of the present invention.

Referring to FIG. 9, it is assumed that the length of a preamble and the transmission region of data are variably configured based on a time resource region (i.e., a fixed time resource region) pre-configured with respect to a specific PRACH configuration. Furthermore, the method described in FIG. 9 may be applied to the structure in which a midamble and data are transmitted together in addition to the structure in which a preamble and data are transmitted together.

For example, a base station may indicate that a UE should transmit the length of a preamble based on a data set (or data type) through a downlink control channel (e.g., PDCCH) (i.e., DCI). In other words, the base station may differently configure the length of a preamble depending on a data set, and may deliver (or indicate) corresponding information to the UE. In this case, a code rate required (or necessary) for a data region may be fixed, and the number of required symbols may be differently configured depending on the data set.

For example, the number of required symbols may be configured as 8 as in FIG. 9(a), may be configured as 7 as in FIG. 9(b), or may be configured as 6 as in FIG. 9(c). To this end, a base station may deliver, to a UE, configuration information on the number of required symbols through higher layer signaling or may directly indicate information on the number of symbols required for the transmission of corresponding data with respect to the UE depending on a data set.

In this case, the remaining symbol(s) other than a symbol necessary for the data set (i.e., symbol necessary to transmit the corresponding data set) may be used for the transmission of a preamble. Furthermore, the base station may configure (or indicate) that the UE should transmit the data using a frequency division multiplexing (FDM) method with respect to a transmission structure having a different preamble length by taking into consideration the length of a cyclic prefix (CP) of a data part.

Furthermore, the above-described methods may be applied in a cell-specific manner and/or a UE-specific manner depending on the situation (i.e., network situation).

Furthermore, in relation to an initial access procedure, an analog beamforming operation supported in an NR system may be additionally taken into consideration. In relation to this, in various embodiments of the present invention, a base station may deliver information, indicating whether a beam management operation (e.g., beam sweeping) is necessary for the initial access procedure (i.e., RACH procedure), to a UE through a downlink control channel (e.g., PDCCH) (i.e., DCI).

Furthermore, if a beam management operation is performed, a base station may configure beam management duration (e.g., beam sweeping duration) and deliver information on the configured beam management duration to a UE through a downlink control channel (e.g., PDCCH) (i.e., DCI). For example, a method of configuring short beam sweeping duration depending on a UE so that a base station and/or the UE perform beam sweeping on only some beams may be taken into consideration.

Furthermore, a method related to the above-described beam management operation may be applied in a cell-specific manner in addition to a UE-specific manner.

Furthermore, as described above, in an NR system, a RAN controlled state meaning the state in which a network does not release the identifier of a UE may be taken into consideration in addition to the RRC Idle state and the RRC connected state. In this case, timing sync is not accurately configured in the UE, and the UE may be the state in which it has to estimate transmission power through an open-loop method.

In relation to this, in various embodiments of the present invention, a base station may configure a cyclic prefix (CP) lengthily with respect to PUSCH transmission in addition to RACH transmission (i.e., RACH procedure). In this case, the base station may configure that a UE should transmit the PUSCH in a specific resource. Such a configuration may be designated (or indicated) through downlink control information (e.g., PDCCH) (i.e., DCI). In this case, a method of lengthily repeating a DMRS may be taken into consideration as a method of configuring the CP lengthily.

Furthermore, transmission resources for UEs in which the CP length is lengthily configured may be assigned (or allocated) separately from transmission resources for common UEs.

Figure 10:
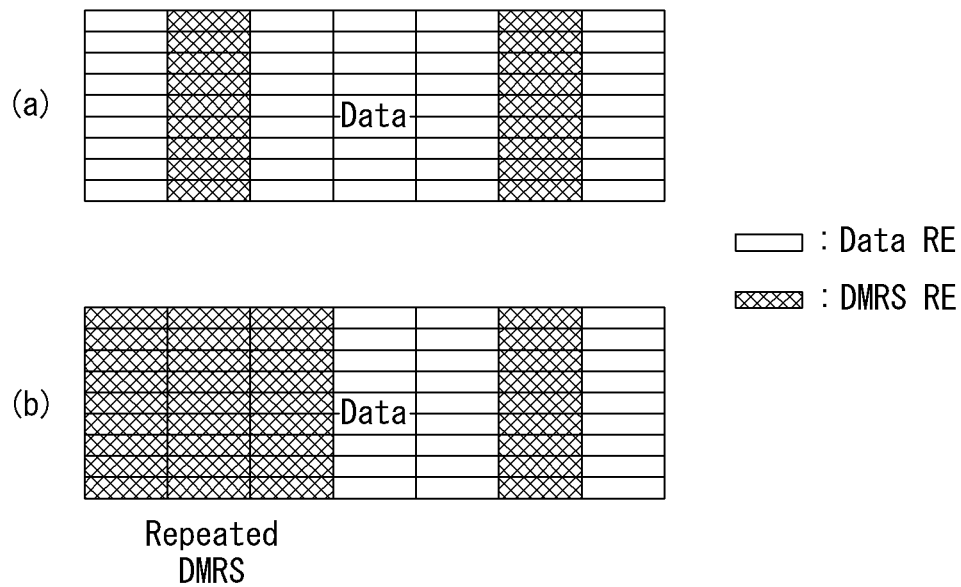
FIG. 10 illustrates examples of a subframe configuration for uplink random access to which a method proposed in this specification may be applied.

FIG. 10 illustrates examples of a subframe configuration for uplink random access to which a method proposed in this specification may be applied. FIG. 10 is merely for convenience of description and does not limit the scope of the present invention.

Referring to FIG. 10, FIG. 10(a) illustrates a subframe for common data transmission (e.g., PUSCH transmission), and FIG. 10(b) illustrates a subframe for uplink random access.

In the case of FIG. 10(b), unlike in the case of FIG. 10(a), the subframe may be configured according to a method of raising the ratio of a DMRS and repetitively allocating a DMRS to a plurality of symbols. For example, the DMRS may be contiguously allocated to 3 symbols. There is an effect in that the length of a preamble (i.e., preamble in a RACH procedure) is different depending on the number of symbols in which a DMRS is contiguously repeated.

In this case, a method of lengthily transmitting one DMRS across several symbols may be taken into consideration instead of a method of adding a separate CP to a repeated DMRS in each symbol unit and transmitting the DMRS. In this case, channel estimation may be performed using the lengthily transmitted DMRS or a DMRS may be configured to be allocated to a data region and channel estimation may be performed through a separate DMRS. A subframe of such a structure may be transmitted in the existing PUSCH region or may be transmitted in a separately configured resource region.

A base station may transmit information on a subframe (i.e., DMRS configuration within the subframe), such as that described above, to a UE through higher layer signaling and/or a downlink control channel (e.g., PDCCH). However, a UE(s) using a subframe, such as that described above, may determine a reference point of time through a downlink control channel (e.g., PDCCH) for a transmission configuration because synchronization for a transmission point of time has not been performed on the corresponding UE(s). For example, the UE may be configured to transmit a subframe, assuming TA=0 based on a PDCCH transmission point of time or to separately configure a TA assignment value for a PDCCH and to transmit a subframe.

In the above-described various embodiments of the present invention, a method using a downlink control channel (e.g., PDCCH) (i.e., DCI) has been taken into consideration in order to indicate (or configure) various configurations (e.g., a specific PRACH configuration, the type of data transmitted in a data region) related to initial access. However, in order to indicate the various configurations related to initial access, a method using a paging procedure between a base station and a UE may be taken into consideration. In this case, the base station may indicate (or configure) that a UE should separately assign the type of data one by one or configure a plurality of sets (i.e., a plurality of data sets) based on a combination between a plurality of data types and transmit one of the sets.

Furthermore, in various embodiments of the present invention, a base station may classify a plurality of preambles into a plurality of sets through higher layer signaling and/or physical layer signaling, and may notify a UE of the classification. In other words, a base station may deliver preamble configuration information, classified into a plurality of sets (or groups), to a UE through higher layer signaling and/or physical layer signaling. In this case, the UE may be configured to select (or identify) a preamble, belonging to one of the plurality of sets, based on the type of data to be transmitted through a data region and to transmit the preamble. Such a configuration method may be applied to a method of adjusting the coding rate of data based on the type of data transmitted in a data region, while not changing the length of a preamble and the size of the data region.

Furthermore, in various embodiments of the present invention, a method of assigning, by a base station, a plurality of PRACH resource regions through higher layer signaling and/or physical layer signaling may also be taken into consideration. In this case, the base station may additionally classify a PRACH configuration to be transmitted in each PRACH resource region and/or a format within PRACH configuration.

Figure 11:
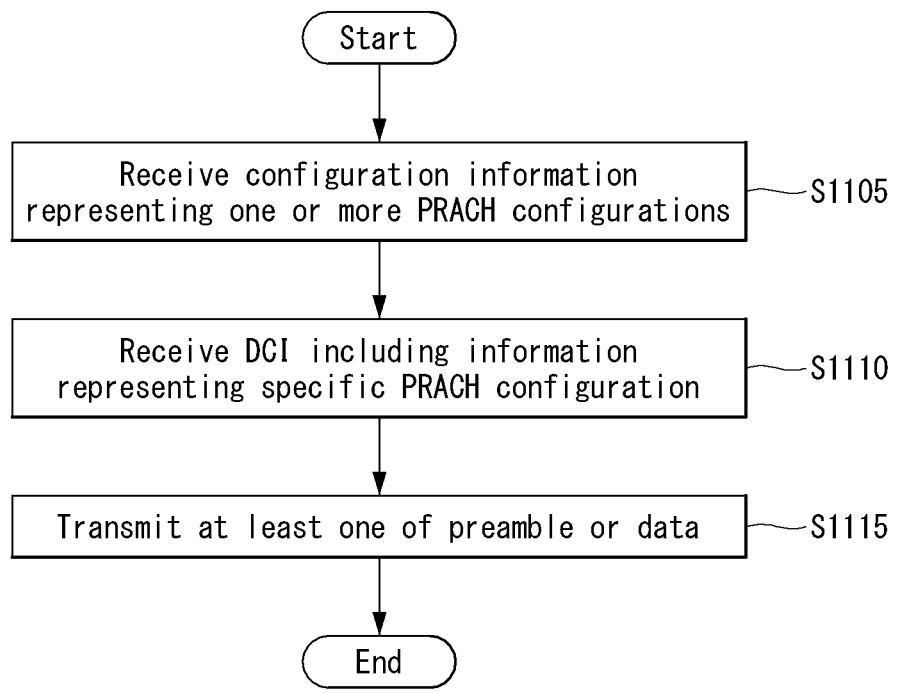
FIG. 11 illustrates an operational flowchart of a terminal performing initial access to which a method proposed in this specification may be applied.

FIG. 11 illustrates an operational flowchart of a terminal performing initial access to which a method proposed in this specification may be applied. FIG. 11 is merely for convenience of description and does not limit the scope of the present invention.

Referring to FIG. 11, it is assumed that a UE performs an initial access procedure on a base station by transmitting a preamble through a PRACH.

At step S1105, the UE receives, from a base station, configuration information indicating (or representing) one or more PRACH configurations. In this case, the one or more PRACH configurations may be configured based on at least one of whether to transmit the data or a transmission order between the preamble and the data. For example, the one or more PRACH configurations may mean the PRACH configurations (or PRACH transmission structures) shown in FIG. 7. In this case, the one or more PRACH configurations may be previously defined as configuration information of a table form.

Thereafter, at step S1110, the UE receives DCI including information indicating a specific PRACH configuration. Specifically, the UE may receive DCI, including information indicating a specific PRACH configuration of the one or more PRACH configurations, through a PDCCH from the base station. In this case, the DCI may be configured according to the above-described method.

Thereafter, at step S1115, the UE transmits at least one of a preamble or data. Specifically, the UE may transmit, to the base station, at least one of a preamble or data related to initial access through a PRACH based on the specific PRACH configuration. For example, the UE may transmit the PRACH of a structure, such as FIG. 7, to the base station.

In this case, the UE may further receive configuration information, indicating one or more data sets, from the base station. In this case, the DCI includes indication information on a data set to be transmitted by the UE. The data may correspond to a data set, identified using the indication information (i.e., corresponding to the indication information), among the one or more data sets. For example, the UE may receive indication information indicating a specific data set from the base station, and may transmit, to the base station, data corresponding to the indicated data set along with a preamble.

In this case, the data may include at least one of a contention resolution identifier, a buffer status report, or an RRC connection request. In this case, the data may be configured according to the above-described method.

Furthermore, if a numerology configuration applied to the preamble and a numerology configuration applied to the data are not the same, the data may be transmitted along with at least one DMRS. In this case, the configuration of the DMRS may follow the above-described method.

Furthermore, the DCI further includes information indicating the length of the preamble. The length of the preamble may be configured based on the number of symbols allocated to the transmission region of the data. Furthermore, the number of symbols allocated to the transmission region of the data may be defined based on a data set, corresponding to the data, among one or more previously configured data sets. Furthermore, the length of the preamble and the transmission region of the data may be configured based on a time resource region pre-configured with respect to the specific PRACH configuration. In this case, the length of the preamble and/or the number of symbols may be configured according to the above-described method (e.g., FIG. 9).

Furthermore, the DCI may further include information indicating whether to perform a beam management procedure related to the initial access.

Furthermore, the DCI may further include information indicating a PRACH resource, corresponding to the specific PRACH configuration, among one or more PRACH resources pre-configured with respect to the one or more PRACH configurations.

Furthermore, one of the one or more PRACH configurations may be configured as a default PRACH configuration.

Furthermore, at least one of the preamble or the data may be transmitted only when the UE is a RAN controlled state.

Overview of Apparatus to which the Present Invention May be Applied

Figure 12:
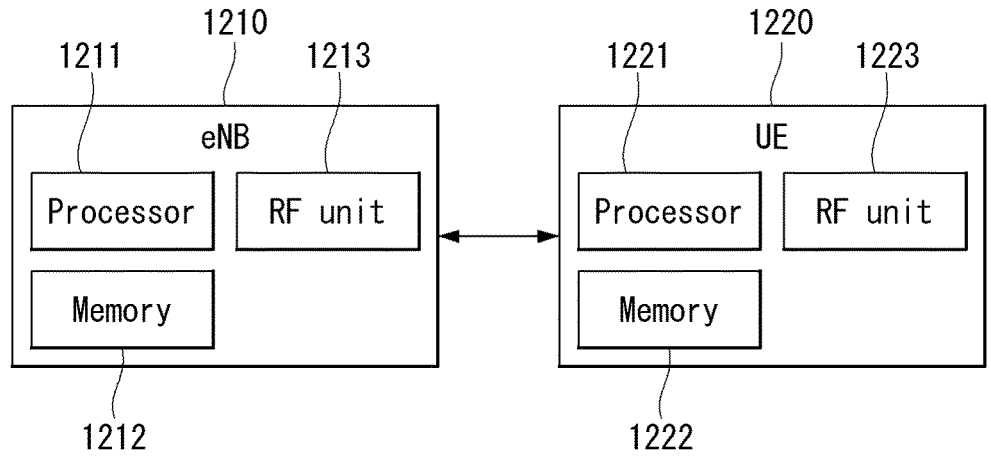
FIG. 12 illustrates a block diagram of a wireless communication apparatus to which methods proposed in this specification may be applied.

FIG. 12 illustrates a block diagram of a wireless communication apparatus to which methods proposed in this specification may be applied.

Referring to FIG. 12, the wireless communication system includes an eNB 1210 and a plurality of UEs 1220 deployed within the area of the eNB 1210.

The eNB 1210 includes a processor 1211, memory 1212, and a radio frequency (RF) unit 1213. The processor 1211 implements the functions, processes and/or methods proposed in FIGS. 1 to 11. The layers of a radio interface protocol may be implemented by the processor 1211. The memory 1212 is connected to the processor 1211 and stores various pieces of information for driving the processor 1211. The RF unit 1213 is connected to the processor 1211 and transmits and/or receives a radio signal.

The UE 1220 includes a processor 1221, memory 1222, and an RF unit 1223.

The processor 1221 implements the functions, processes and/or methods proposed in FIGS. 1 to 11. The layers of a radio interface protocol may be implemented by the processor 1221. The memory 1222 is connected to the processor 1221 and stores various pieces of information for driving the processor 1221. The RF unit 1223 is connected to the processor 1221 and transmits and/or receives a radio signal.

The memory 1212, 1222 may be positioned inside or outside the processor 1211, 1221 and may be connected to the processor 1211, 1221 by various well-known means.

For example, in a wireless communication system supporting low latency service, in order to transmit and receive downlink data (DL data), a UE may include a radio frequency (RF) unit for transmitting and receiving radio signals and a processor functionally connected to the RF unit.

Furthermore, the eNB 1210 and/or the UE 1220 may have a single antenna or multiple antennas.

Figure 13:
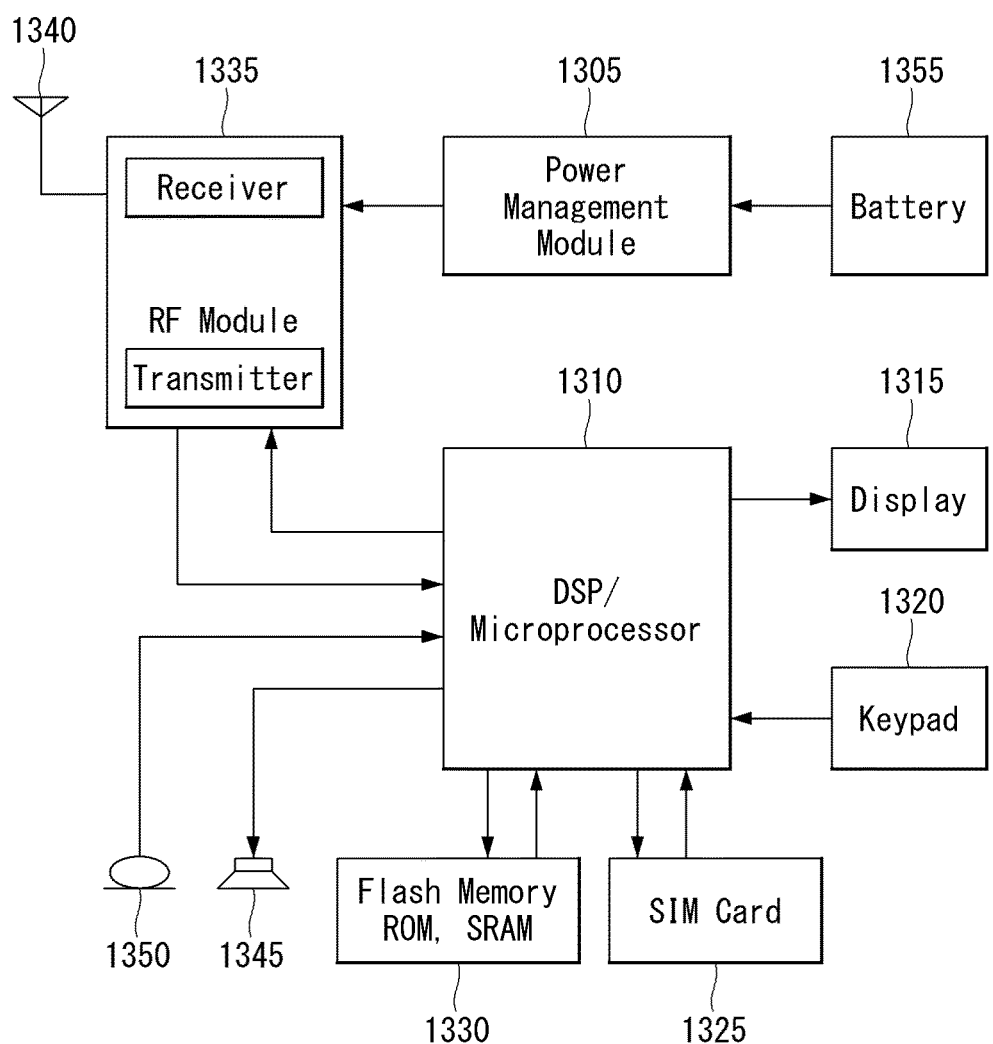
FIG. 13 illustrates a block diagram of a communication apparatus according to an embodiment of the present invention.

FIG. 13 illustrates a block diagram of a communication apparatus according to an embodiment of the present invention.

In particular, FIG. 13 is a diagram illustrating the UE of FIG. 12 more specifically.

Referring to FIG. 13, the UE may include a processor (or digital signal processor (DSP) 1310, an RF module (or the RF unit) 1335, a power management module 1305, an antenna 1340, a battery 1355, a display 1315, a keypad 1320, memory 1330, a subscriber identification module (SIM) card 1325 (this element is optional), a speaker 1345 and a microphone 1350. The UE may further include a single antenna or multiple antennas.

The processor 1310 implements the functions, processes and/or methods proposed in FIGS. 1 to 11. The layers of a radio interface protocol may be implemented by the processor 1310.

The memory 1330 is connected to the processor 1310 and stores information related to an operation of the processor 1310. The memory may be positioned inside or outside the processor 1310 and may be connected to the processor 1310 by various well-known means.

A user inputs command information, such as a telephone number, by pressing (or touching) a button of the keypad 1320 or through voice activation using the microphone 1350, for example. The processor 1310 receives such command information and performs processing so that a proper function, such as making a phone call to the telephone number, is performed. Operational data may be extracted from the SIM card 1325 or the memory. Furthermore, the processor 1310 may recognize and display command information or driving information on the display 1315, for convenience sake.

The RF module 1335 is connected to the processor 1310 and transmits and/or receives RF signals. The processor 1310 delivers command information to the RF module 1335 so that the RF module 1335 transmits a radio signal that forms voice communication data, for example, in order to initiate communication. The RF module 1335 includes a receiver and a transmitter in order to receive and transmit radio signals. The antenna 1340 functions to transmit and receive radio signals. When a radio signal is received, the RF module 1335 delivers the radio signal so that it is processed by the processor 1310, and may convert the signal into a baseband. The processed signal may be converted into audible or readable information output through the speaker 1345.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

The scheme of performing initial access in a wireless communication system of the present invention has been described based on an example in which the scheme is applied to 3GPP LTE/LTE-A systems and a 5G system (new RAT system), but may be applied to various wireless communication systems in addition to the systems.

The invention claimed is:

1. A method of performing initial access by a user equipment in a wireless communication system, the method comprising:
receiving, from a base station, configuration information representing one or more physical random access channel (PRACH) configurations,
receiving, from the base station, downlink control information comprising information representing a specific PRACH configuration among the one or more PRACH configurations, through a physical downlink control channel, and
transmitting, to the base station, at least one of data or a preamble related to the initial access through a PRACH, based on the specific PRACH configuration,
wherein the one or more PRACH configurations are configured based on pre-configured types,
wherein each of the pre-configured types represents a structure related to the PRACH, and
wherein the pre-configured types are configured based on
(i) whether the structure includes (A) a preamble region only or (B) the preamble region and data region, and
(ii) a position of the preamble region associated with the data region.

2. The method of claim 1, further comprising:
receiving, from the base station, configuration information representing one or more data sets,
wherein the downlink control information includes indication information for a data set to be transmitted by the user equipment, and
wherein the data corresponds to a data set identified using the indication information among the one or more data sets.

3. The method of claim 2,
wherein the data comprises at least one of a contention resolution identifier, a buffer status report, or a radio resource control (RRC) connection request.

4. The method of claim 1,
wherein, based on a numerology configuration applied to the preamble and a numerology configuration applied to the data not being identical, the data is transmitted along with at least one demodulation reference signal (DMRS).

5. The method of claim 1,
wherein the downlink control information further comprises information representing a length of the preamble, and
wherein the length of the preamble is configured based on a number of symbols allocated to a transmission region of the data.

6. The method of claim 5,
wherein the number of symbols allocated to the transmission region of the data is determined based on a data set corresponding to the data among pre-configured one or more data sets.

7. The method of claim 5,
wherein the length of the preamble and the transmission region of the data are configured based on a time resource region pre-configured for the specific PRACH configuration.

8. The method of claim 1,
wherein the downlink control information further comprises information representing whether to perform a beam management procedure related to the initial access.

9. The method of claim 1,
wherein the downlink control information further comprises information representing a PRACH resource, corresponding to the specific PRACH configuration, among one or more PRACH resources pre-configured for the one or more PRACH configurations.

10. The method of claim 1,
wherein one of the one or more PRACH configurations is configured as a default PRACH configuration.

11. The method of claim 1,
wherein at least one of the preamble or the data is transmitted when the user equipment is a radio access network (RAN) controlled state.

12. A user equipment configured to perform initial access in a wireless communication system, comprising:
a radio frequency (RF) unit configured to transmit and receive radio signals, and
a processor functionally connected to the RF unit,
wherein the processor is configured to:
receive, from a base station, configuration information representing one or more physical random access channel (PRACH) configurations, receive, from the base station, downlink control information comprising information representing a specific PRACH configuration among the one or more PRACH configurations, through a physical downlink control channel, and transmit, to the base station, at least one of data or a preamble related to the initial access through a PRACH, based on the specific PRACH configuration, wherein the one or more PRACH configurations are configured based on pre-configured types, wherein each of the pre-configured types represents a structure related to the PRACH, and wherein the pre-configured types are configured based on (i) whether the structure includes (A) a preamble region only or (B) the preamble region and data region, and (ii) a position of the preamble region associated with the data region.

13. The user equipment of claim 12, wherein the processor is further configured to:

receive, from the base station, configuration information representing one or more data sets, wherein the downlink control information includes indication information for a data set to be transmitted by the user equipment, and wherein the data corresponds to a data set identified using the indication information among the one or more data sets.

14. The user equipment of claim 13, wherein the data comprises at least one of a contention resolution identifier, a buffer status report, or a radio resource control (RRC) connection request.

15. The user equipment of claim 12, wherein, based on a numerology configuration applied to the preamble and a numerology configuration applied to the data not being identical, the data is transmitted along with at least one demodulation reference signal (DMRS).

16. The user equipment of claim 12, wherein the downlink control information further comprises information representing a length of the preamble, and wherein the length of the preamble is configured based on a number of symbols allocated to a transmission region of the data.

17. The user equipment of claim 16, wherein the number of symbols allocated to the transmission region of the data is determined based on a data set corresponding to the data among pre-configured one or more data sets.

18. The user equipment of claim 16, wherein the length of the preamble and the transmission region of the data are configured based on a time resource region pre-configured for the specific PRACH configuration.

19. The user equipment of claim 12, wherein the downlink control information further comprises information representing whether to perform a beam management procedure related to the initial access.

20. The user equipment of claim 12, wherein the downlink control information further comprises information representing a PRACH resource, corresponding to the specific PRACH configuration, among one or more PRACH resources pre-configured for the one or more PRACH configurations.

* * * * *